Aug. 3, 1965    R. MANLY ETAL    3,199,024
APPARATUS AND METHOD FOR DETERMINING THE IMPEDANCE
OF A COMPONENT IN A COMPLEX NETWORK WITHOUT
REMOVING THE COMPONENT FROM THE NETWORK
Filed Oct. 4, 1961
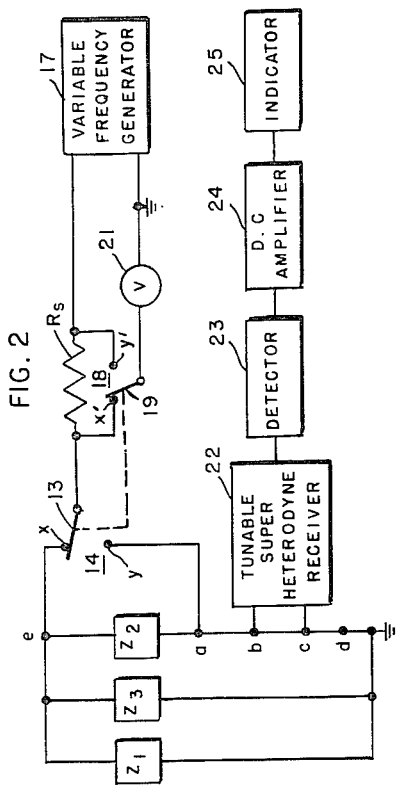
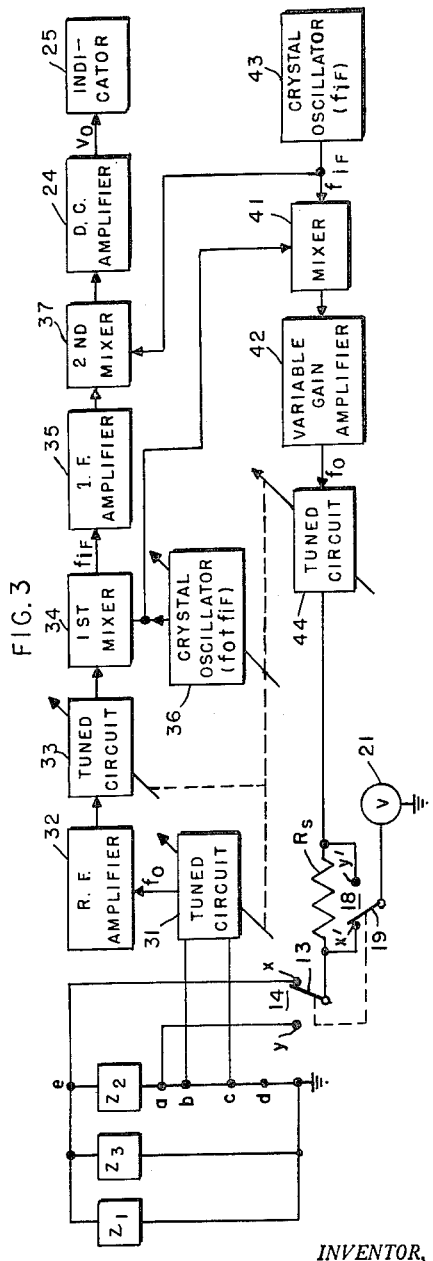
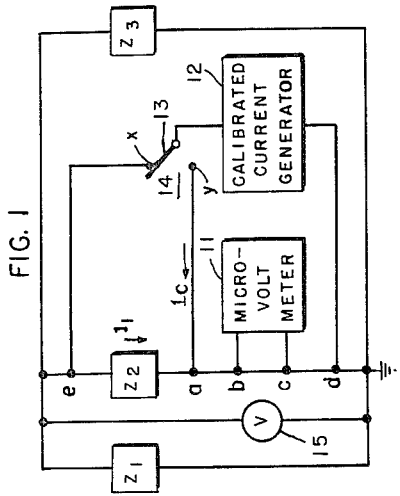
*INVENTOR,*
R. MANLY
W. MILLER
BY
*Harry M. Saragovitz*
ATTORNEY

United States Patent Office 3,199,024
Patented Aug. 3, 1965

3,199,024
APPARATUS AND METHOD FOR DETERMINING THE IMPEDANCE OF A COMPONENT IN A COMPLEX NETWORK WITHOUT REMOVING THE COMPONENT FROM THE NETWORK
Ron Manly, Hawthorne, and William G. Miller, Burbank, Calif., assignors to the United States of America as represented by the Secretary of the Army
Filed Oct. 4, 1961, Ser. No. 142,992
19 Claims. (Cl. 324—57)

The present invention relates to means for measuring the current in a component of a complex network. A method is presented which allows measurement of impedances from 1 to 100,000 ohms. This range covers components typical in radio frequency (R.F.) circuitry, from by-pass capacitors (representing relatively low impedances) to moderately large R.F. chokes (high impedances), in the 1 to 500 megacycle per second mc./s. frequency range.

An object of the present invention is to provide an improved impedance measuring means.

Another object of the present invention is to provide means for measuring the impedance of a network within a complex electrical system over a wide range of frequencies.

To accomplish the above named objects a signal generator is first used to apply a signal to an impedance to be measured. A very sensitive voltmeter is connected across a portion of the lead wire of the impedance, and a voltmeter is connected across the whole of the impedance, both voltmeters being read upon the application of a signal from the signal generator. Next, in one arrangement the signal generator is connected through a known resistor to the lead to which the very sensitive voltmeter is connected, and is adjusted so that the voltage reading of the sensitive voltmeter is the same as with the generator connected directly across the impedance. The voltage across the resistor is read. With the values of the voltage across both the impedance and the resistor known, and the value of the resistor itself known, the value of the impedance can be readily computed.

An important feature of the invention is the use of a superheterodyne receiver as the sensitive voltmeter. Whereas a broad-band sensitive voltage-sensing device, such as a vacuum-tube voltmeter, has very definite limitations on its sensitivity due to noise when high amplification is attempted for high sensitivity, a superheterodyne receiver, because of its much narrower band-width, has a far more favorable signal-to-noise ratio. For the purposes of this invention, the receiver band-width can be made quite narrow.

A further feature of the invention is the in-circuit testing of components which are shunted by other components, and without disconnecting the tested components.

The exact nature of this invention, as well as other objects and advantages thereof will be readily apparent from consideration of the following specification taken in connection with the annexed drawings in which:

FIGURE 1 shows a block diagram of the broad concept of the present invention;

FIGURE 2 shows a block diagram of the preferred embodiment of the present invention; and FIGURE 3 shows a more detailed presentation of the preferred embodiment of FIGURE 2.

Referring now to the drawings, wherein like reference characters designate like or corresponding parts throughout the several figures, there is shown in FIG. 1 impedances $Z_1$, $Z_2$, and $Z_3$ connected in parallel and forming the impedance of a complex network, impedance $Z_2$ being the impedance to be measured and impedances $Z_1$ and $Z_3$ representing the impedance of components shunting $Z_2$. A four-prong probe is connected to sensitive microvoltmeter 11 and to calibrated current generator 12. The probe (physical structure not actually shown) is connected to points $a$, $b$, $c$ and $d$ along the ground side of the lead of impedance $Z_2$. An excitation probe is connected from the hot side (point $e$) if impedance $Z_2$ to contact $x$ of switch 14. Switch arm 13 is connected to the live terminal of generator 12. Point $a$ is connected by the four-prong probe to contact $y$ of the switch, and point $d$ is connected by the same probe to the other terminal of generator 12, which is in turn at ground potential. Point $b$ and $c$ are connected by this probe to microvoltmeter 11. Voltmeter 15 shunts impedance $Z_2$.

Switch 14 is used to connect generator 12 to either point $a$ or point $e$ depending on whether switch arm 13 is positioned to contact $x$ or $y$. With switch arm 13 connected to contact $x$ (as shown in FIGURE 1), a certain voltage indication, $V_{bc}$, is observed on microvoltmeter 11 and a voltage $V_1$ is read on voltmeter 15. Next, switch arm 13 is connected to contact $y$, and generator 12 is adjusted so that the same voltage $V_{bc}$ is observed on sensitive voltmeter 11 as in the previous switch position. Accordingly, the current which had passed through the impedance is now directly indicated by calibrated current generator 12, i.e., the current $I_1$ passing through $Z_2$ and through the grounded lead of $Z_2$, when switch arm 13 is connected to contact $x$, is equal to the current $I_c$ in the lead itself, when switch arm 13 is connected to contact $y$. Generator 12, when switch arm 13 is connected to contact $x$, does not indicate the value of $I_1$ as its output is also applied to $Z_1$ and $Z_2$.

The impedance $Z_2$ can now be computed simply:

$$Z_2 = \frac{V_1}{I_1}$$

Since $I_c = I_1$, and where $R_{bc} \ll Z_2$, then:

$$Z_2 = \frac{V_1}{I_c}$$

Having determined $V_1$ and $I_c$ by the procedure described above, the value of impedance $Z_2$ is readily calculated.

Since the impedance measuring technique makes $I_c = I_1$, it is not necessary to know the resistance $R_{bc}$ of the portion $b$-$c$ of the lead of $Z_2$, nor the error of microvoltmeter 11.

In the preferred embodiment of FIG. 2 impedances $Z_1$ and $Z_3$ again represent any circuit components shunting $Z_2$, as in FIG. 1. Switch arm 13 is connected through a standard resistor $R_s$, of known value, to one terminal of variable frequency generator 17, its other terminal being grounded. Switch 18 has contacts $x^1$ and $y^1$ connected to respective sides of resistor $R_s$. Switch arm 19 is connected to voltmeter 21, the other terminal of which is grounded. Switch arms 13 and 19 can be ganged. Points $b$ and $c$ are connected to tunable super-heterodyne receiver 22 which, in turn, is connected through detector 23 and direct current (D.C.) amplifier 24 to indicator 25. This may be an oscilloscope or a d.-c. voltmeter.

With switches 14 and 18 in the $x$ and $x^1$ positions, respectively, voltmeter 21 and indicator 25 are read, indicating the voltages across impedance $Z_2$ and across the lead between points $b$ and $c$ respectively. Next, switches 14 and 18 are put in the $y$ and $y^1$ positions respectively, and generator 17 is varied until indicator 25 has the same reading as previously. Then voltmeter 21 is read, indicating the voltage across resistor $R_s$. Since the resistance $R_{bc}$ (lead resistance between points $b$ and $c$) is very small compared with resistor $R_s$ and impedance $Z_2$, it can be neglected in the calculation of the value of impedance $Z_2$ and in the voltage value indicated by voltmeter 21.

As variable frequency generator 17 is adjusted so that indicator 25 will have the same reading each time that voltmeter 21 is read, the current flowing in the lead wire is the same for these readings.

Therefore: $I_1 = I_c$.

Since $$I_1 = \frac{V_1}{Z_2} \text{ and } I_c = \frac{V_2}{R_s}$$

Then by substitution:

$$\frac{V_1}{Z_2} = \frac{V_2}{R_s}$$

where $V_2$ is the voltage reading on voltmeter 21 with the switches in the $y$ and $y^1$ positions, and $$Z_2 = \frac{R_s V_1}{V_2}$$

A further embodiment of the invention is shown in the block diagram of FIG. 3. The sensitive voltmeter is basically a receiver having tuned input circuit 31 connected across points $b$ and $c$ of the lead of impedance $Z_2$. The receiver includes R-F amplifier 32, tuned circuit 33, first mixer 34 and intermediate frequency (I.F.) amplifier 35 tuned to frequency $f_{if}$. Tuned circuits 31 and 33 are variable in frequency, $f_0$. Crystal oscillator 33 supplies a signal at any of several frequencies which equal $f_0 + f_{if}$ to first mixer 34, the selection of these frequencies being correlated with the tuning of 31 and 33. Second mixer (for example, a linear product detector) and D.-C. amplifier 24 connect I.F. amplifier 35 to indicator 25, to essentially complete the receiver system, except for the connection of oscillator 43 to mixer 37, discussed below. The R-F signal generator includes mixer 41 and variable-gain amplifier 42 connected between crystal oscillator 43 (supplying a signal at frequency $f_{if}$) and tuned circuit 44 (tuned to frequency $f_0$). The tuned circuit is connected through resistor $R_s$ to switch arm 13 of switch 14. Crystal oscillator 36 and crystal oscillator 43 are both connected to mixer 41. Voltmeter 21 is connected by switch 18 to either side of resistor $R_s$. Switches 14 and 18 are ganged together.

With the switches in the respective $x$ and $x^1$ positions, mixer 41 receives signals from both oscillators 36 and 43 to produce a signal at frequency $f_0$. This is applied through amplifier 42, tuned circuit 44 and resistor $R_s$ to terminal $e$ of impedance $Z_2$. Tuned circuit 31 samples a portion of the signal (about $10^{-8}$ volts) across points $b$ and $c$ of the ground lead of impedance $Z_2$, and couples it through amplifier 32 and tuned circuit 33 to first mixer 34. There this signal at $f_0$ beats with the signal $f_0 + f_{if}$ from oscillator 36 to develop a signal at frequency $f_{if}$. This signal is passed through amplifier 35 to second mixer 37, which may be a product detector. The I.F. signal from amplifier 35 is added in 37 to the signal $f_{if}$ from oscillator 43 to form a D.-C. signal. This is amplified by 24 and applied to indicator 25 as voltage $V_0$. At the same time that voltage $V_0$ is read on the indicator, voltage $V_1$ is read on voltmeter 21. For ease of operation it is best to set variable amplifier 42 so that voltage $V_0$ is an integer, say 5 volts D.C., for example.

Next, switches 14 and 18 are put in their respective $y$ and $y^1$ positions and the gain of amplifier 24 is adjusted so that the voltage $V_0$ is again 5 volts D.C. (the same voltage as with switches in the respective $x$ and $x^1$ positions). When this is accomplished voltmeter 21 is read, representing voltage $V_2$ across standard resistor $R_s$.

For the reasons already explained in connection with FIGURE 2 above, the value of impedance $Z_2$ can be readily calculated by inserting the appropriate value into the following equation:

$$Z_2 = \frac{R_s V_1}{V_2}$$

By pretuning tuned circuits 31, 33 and 44 and oscillator 36 to several frequencies selected across the 1–500 mc./s. spectrum and repeating the above procedure at each frequency the value of impedance $Z_2$ can be determined over the entire frequency spectrum. In practice, six frequencies have been found to be sufficient in most cases.

While, as stated above, the second mixer 37 is a linear product detector, other types of mixers, such as a square law detector, will work as well. If a square law detector is to be used, the connection between crystal oscillator 43 and second mixer 37 can be eliminated. However, because oscillators 36 and 43 provide both working frequencies for both the signal generator and the receiver, rapid and exact selection of frequencies is assured for both units. A product detector as mixer 37 makes excellent use of the signals derived from these oscillators to provide a very efficient and sensitive overall system.

Voltmeter 21, used in the systems of FIGURES 2 and 3, can be a high-level R-F vacuum-tube voltmeter capable of measuring in the 0.1 to 100 volt R.M.S. range. It is used to measure the voltage across the component or impedance being measured and does not need to possess the sensitivity of the receiver.

The frequency switching operation, read-out function, and computations can be carried out by a computer (not shown) properly programmed. The computer would be coupled to indicator 25 to receive its D.C. output, to voltmeter 21 to receive its output, and to the tuning portions of tuned circuits 31, 33, 44 and oscillator 36 to adjust their tuning.

The foregoing disclosure relates to a preferred embodiment of the invention. Numerous modifications or alterations may be made therein without departing from the spirit and scope of the invention set forth in the appended claims.

What is claimed is:

1. A device for measuring the impedance of a network having leads connected in a complex electrical system comprising: a calibrated current generator having two terminals, one of said terminals of said generator being connected at a first point on one of said leads of said network, a switching means having a switch arm connected to the other terminal of said generator and a first contact connected to another of said leads of said network, said switching means having a second contact connected to said one lead at a second point closer to said network than that to which said one terminal of said generator is connected, a micro-voltmeter having terminals connected to said one lead between said first and second points, and a voltmeter connected across said network.

2. A device for measuring the impedance of a component having leads connected in a complex electrical system comprising: coupling means having first, second, third and fourth terminals connected sequentially along one of said leads of said component; a switching means having a switch arm and first and second contacts, said first contact connected to another of said leads of said component, said second contact connected to said first terminal of said coupling means; a calibrated current generator having first and second terminals connected to said switch arm and to said fourth terminal of said coupling means, respectively; a microvoltmeter having first and second terminals connected to said second and third terminals of said coupling means, respectively; and a voltmeter having first and second terminals connected to said fourth terminal of said coupling means and to said lead to which said first contact is connected, respectively.

3. A device for measuring the impedance of a component having leads connected in a complex electrical system comprising: a resistor having first and second ends; a variable frequency signal generating means connected to said second end of said resistor; a voltmeter; switching means connected to said first end of said resistor and to said component for alternately connecting said generating means to said component and to a portion of one of said leads of said component, and connected to said voltmeter for alternately connecting said voltmeter to said component and to said resistor in series with said portion of said one of said leads; and sensitive voltage measuring means connected across a section of said portion of said one lead.

4. The device of claim 3 wherein said sensitive voltage measuring means comprises a tunable super-heterodyne receiver having an input connected across said section of said portion of said one lead, said receiver also having an output, a direct current amplifier, a detector connecting said output of said receiver to said amplifier, and an indicating means connected to said amplifier.

5. The device of claim 3 wherein said sensitive voltage measuring means comprises a first tuned circuit having an output and an input connected across said section of said portion of said one lead, a radio-frequency amplifier connected to said output of said first tuned circuit, a second tuned circuit connected to said radio-frequency amplifier, a first mixer connected to said second tuned circuit, a first crystal oscillator and an intermediate-frequency amplifier connected to said first mixer, a second mixer connected to said intermediate-frequency amplifier; an indicator, and a direct current amplifier connecting said second mixer to asid indicator.

6. The device of claim 5 wherein said variable frequency signal generating means comprises a third tuned circuit connected to said second end of said resistor, a variable gain amplifier connected to said third tuned circuit, a third mixer connected to said variable gain amplifier and a second crystal oscillator and said first crystal oscillator connected to said third mixer.

7. The device of claim 6 wherein said first crystal oscillator has an output signal at frequency $(f_0+f_{IF})$ and said second crystal oscillator has an output signal at frequency $f_{IF}$ and wherein said first, second and third tuned circuit are gang-tuned to frequency $f_0$.

8. A device for measuring the impedance of a component having leads connected in a complex electrical system comprising; coupling means having first, second, third and fourth terminals connected sequentially along one of said leads of said component; a first switching means having a switch arm and first and second contacts, said first contact of said first switching means being connected to another of said leads of said component, said second contact of said first switching means being connected to said first terminal of said coupling means; a second switching means having a switch arm and first and second contacts; a resistor having first and second ends connected to said first and second contacts, respectively, of said second switching means, said first end of said resistor being connected to said switch arm of said first switching means; a voltmeter connected between said switch arm of said second switching means and said fourth terminal of said coupling means; a sensitive voltage measuring means having first and second input terminals connected to said second and third terminals of said coupling means, respectively; and a variable frequency signal generating means connected to said second end of said resistor.

9. The device of claim 8 wherein said sensitive voltage measuring means comprises a first tuned circuit having input terminals connected to said second and third terminals of said coupling means and an output, a radio-frequency amplifier connected to said output of said first tuned circuit, a second tuned circuit connected to said radio-frequency amplifier, a first mixer connected to said second tuned circuit, a first crystal oscillator and an intermediate-frequency amplifier connected to said first mixer, a second mixer connected to said intermediate-frequency amplifier, an indicator, and a direct-current amplifier connecting said second mixer to said indicator.

10. The device of claim 9 wherein said variable frequency signal generating means comprises a third tuned circuit connected to said second end of said resistor, a variable gain amplifier connected to said third tuned circuit, a third mixer connected to said variable gain amplifier, a second crystal oscillator and said first crystal oscillator being connected to said third mixer.

11. The device of claim 10 wherein said first, second, and third tuned circuits and said first crystal oscillator are gang-tuned, and wherein said switch arms of said first and second switches are ganged for alternately connecting said switch arms of said switches to their respective first contacts and to their respective second contacts.

12. A device for measuring the impedance of a component having leads connected in a complex electrical system comprising: coupling means having first, second, third and fourth terminals connected sequentially along one of said leads of said component; a first switching means having a switch arm and first and second contacts, said first contact of said first switching means being connected to another of said leads of said component, said second contact of said first switching means being connected to said first terminal of said coupling means; a second switching means having a switch arm and first and second contacts; a resistor having first and second ends connected to said first and second contacts of said second switching means, said first end of said resistor being connnected to said switch arm of said first switching means; a voltmeter connected between said switch arm of said second switching means and said fourth terminal of said coupling means; a variable frequency generator connected to said second end of said resistor; a tunable superheterodyne receiver having first and second input terminals connected to said second and third terminals of said coupling means, respectively, and an output terminal; a direct current amplifier; a detector connected between said output terminal of said receiver and said amplifier; and an indicating means connected to said amplifier.

13. A device for measuring the impedance of a component having leads connected in a complex electrical system comprising: coupling means having first, second, third and fourth terminals connected sequentially along one of said leads of said component; a first switching means having a switch arm and first and second contacts, said first and second contacts of said first switching means being connected to another of said leads of said component and to said first terminal of said coupling means, respectively; a second switching means having a switch arm and first and second contacts; a resistor having first and second ends connected to said first and second contacts, respectively, of said second switching means, said first end of said resistor being connected to said switch arm of said first switching means, a voltmeter connected between said switch arm of said second switching means and said fourth terminal of said coupling means; a first tuned circuit having input terminals connected to said second and third terminals of said coupling means, and an output, a radio-frequency amplifier connected to said output of said first tuned circuit; a second tuned circuit connected to said radio-frequency amplifier; a first mixer connected to said second tuned circuit; a first crystal oscillator and an intermediate-frequency amplifier connected to said first mixer; a second mixer connected to said intermediate-frequency amplifier; an indicator; a direct-current amplifier connecting said second mixer to said indicator; a third tuned circuit connected to said second end of said resistor; a variable gain amplifier connected to said third tuned circuit; a third mixer connected to said variable gain amplifier; a second crystal oscillator and said first crystal oscillator connected to said third mixer, said second crystal oscillator being connected to said second mixer.

14. The device of claim 13 wherein said first, second and third tuned circuits and said first crystal oscillator have ganged tuning controls, said tuned circuits being tuned to frequency $f_0$ and said first crystal oscillator being tuned to frequency $(f_0+i_{IF})$; and wherein said second crystal oscillator is tuned to frequency $f_{IF}$.

15. The device of claim 14 wherein said switch arms of said first and second switches are ganged for alternately connecting said switch arms of said switches to their respective first contacts and to their respective second contacts.

16. A method of measuring the impedance of a component having leads connected in a complex electrical system comprising the steps of: applying a signal across said component and measuring the voltage across said component and the voltage across a portion of one of said leads of said component, disconnecting said signal from said component, applying through said portion of said lead a known current whose magnitude is such that the voltage across said portion of said lead is the same as previously measured, and computing the impedance of said component from the following identity:

$$Z = \frac{V}{I_c}$$

where Z is the impedance of the component, V is the voltage across said component and $I_c$ is the known current.

17. A method of measuring the impedance of a component having leads connected in a complex electrical system comprising the steps of: attaching sequentially along one of said leads of said component first, second, third and fourth terminals of a coupling means, connecting a sensitive voltage measuring means across said second and third terminals of said coupling means, connecting a voltage measuring means between another of said leads of said component and said fourth terminal of said coupling means, applying a signal between said other of said leads and said fourth terminal to obtain readings on said sensitive voltage measuring means and said voltage measuring means, disconnecting said signal, applying to said first terminal of said one lead a known current whose magnitude is such that the voltage across said second and third terminals is the same as previously read on said sensitive voltage measuring means, and computing the impedance of said component from the following identity:

$$Z = \frac{V}{I_c}$$

where Z is the impedance of the component, V is the voltage across said component and $I_c$ is the known current.

18. A method of measuring the impedance of a component having leads connected in a complex electrical system comprising the steps of attaching sequentially along one of said leads of said component first, second, third and fourth terminals of a coupling means, connecting a tunable superheterodyne voltage measuring means across said second and third terminals, applying a signal from a variable frequency source through a known value resistor between another of said leads and said fourth terminal and simultaneously measuring the voltage between said other of said leads and said fourth terminal and observing the reading on said superheterodyne measuring means, switching the signal applied through said resistor from said other of said leads to said first terminal, adjusting the voltage of the signal from said variable frequency source until said superheterodyne measuring means reads the same as previously observed, measuring the voltage across said resistor, and computing the impedance of said component from the following identity:

$$Z = \frac{R_s V_1}{V_2}$$

where Z is the impedance of the component, $R_s$ is the resistance of said resistor, $V_1$ is the voltage between said other of said leads and said fourth terminal, and $V_2$ is the voltage across said resistor.

19. A method of measuring the impedance of a component having leads connected in a complex electrical system comprising the steps of: applying a signal across said component through a known resistance and measuring the voltage across said component and the voltage across a portion of one of said leads; removing said signal from said component; applying said signal across said portion of one of said leads through said resistance; adjusting the amplitude of said signal until the voltage across said portion is the same as previously measured across this same portion; measuring the voltage across said resistance; and computing the impedance of said component from the following identity:

$$Z = \frac{R_s V_1}{V_2}$$

where Z is the impedance of said component, $R_s$ is said known resistance, $V_1$ is the voltage across said component and $V_2$ is the voltage across said known resistance.

References Cited by the Examiner

UNITED STATES PATENTS

| 2,080,308 | 5/37 | Frazier | 324—60 |
| 2,611,005 | 9/52 | Wilson | 324—52 |
| 2,636,928 | 4/53 | Bernard | 324—57 |
| 3,041,532 | 6/62 | Bidlingmaier et al. | 324—57 |

OTHER REFERENCES

"Impedance Measuring Methods," article in Radio-Craft, August 1948, page 29.

"Practical Impedance Checker," article in Radio-Electronics, December 1953, page 58.

WALTER L. CARLSON, *Primary Examiner.*

FREDRICK M. STRADER, *Examiner.*